June 10, 1930.  R. S. POTTER  1,763,324
DOOR HOLDER
Filed Dec. 15, 1927
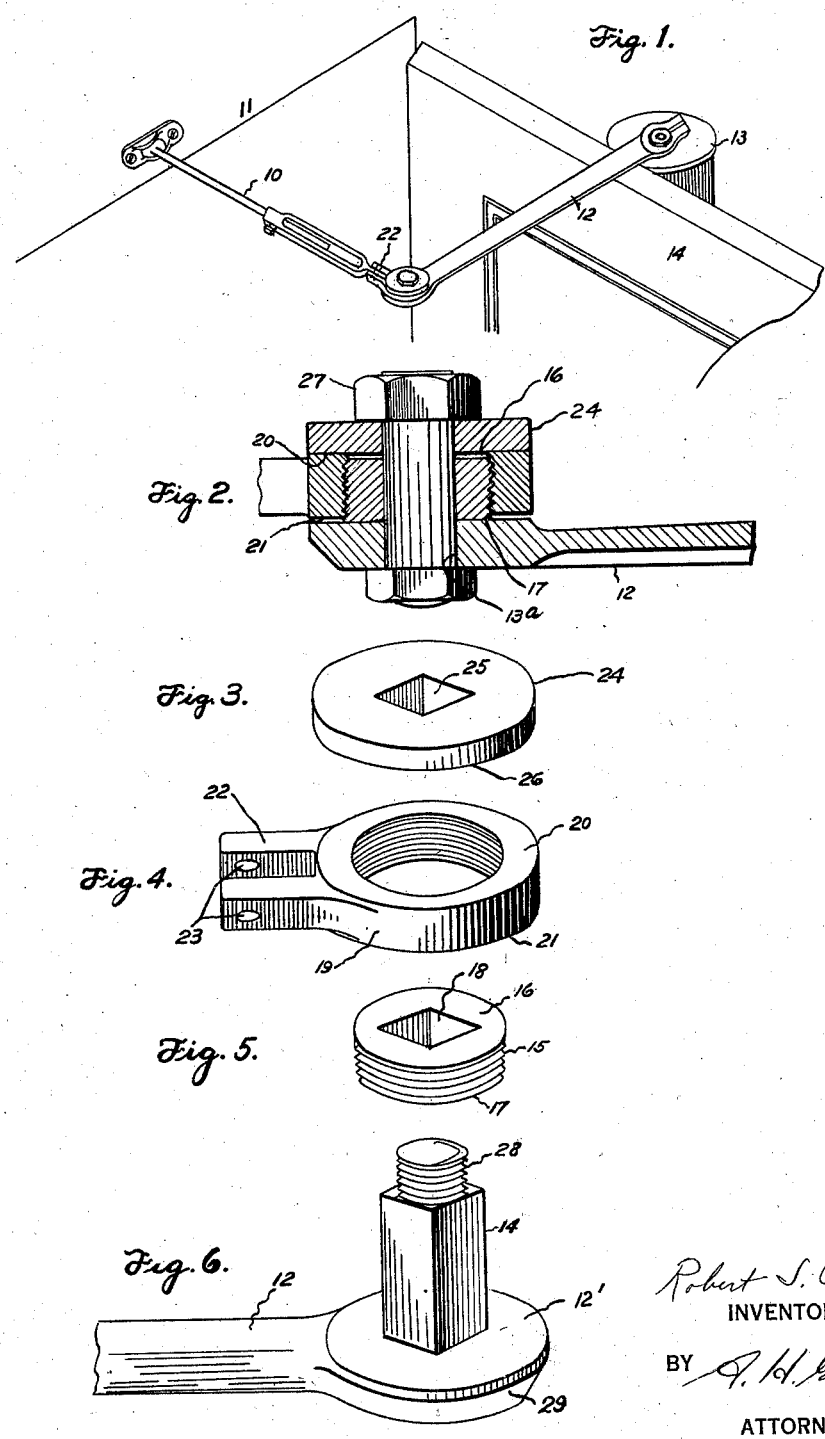
Robert S. Potter
INVENTOR
BY A. H. Golden
ATTORNEY Patented June 10, 1930

1,763,324

UNITED STATES PATENT OFFICE

ROBERT S. POTTER, OF GREENWICH, CONNECTICUT, ASSIGNOR TO THE YALE & TOWNE MANUFACTURING COMPANY, OF STAMFORD, CONNECTICUT

DOOR HOLDER

Application filed December 15, 1927. Serial No. 240,301.

This invention relates to a door holder of the type in which a plurality of friction faces are brought together upon the opening of the door so as to hold the same in an open position.

Door holders of this type are usually constructed so that some change must be made in the arrangement of the holder mechanism to adapt the same to right hand or left hand doors. My invention obviates the necessity for this re-arrangement of the parts, since my holder arm will function equally well for a right or left hand door without the slightest change or displacement of the parts or any adjustment whatsoever.

While this object has been accomplished, by other patentees, my invention is of a very simple and compact type, and accomplishes the necessary results with a minimum of parts.

In the drawings Figure 1 is an isometric view of my door holder showing the same applied to a door closer assembly. Fig. 2 is a view in section of the friction parts showing the action of the same. Fig. 3 is a view of the uppermost friction disk; Fig. 4 is a view of my friction block; Fig. 5 is a view of my friction sleeve; Fig. 6 is view of the end position of my door closer arm and the bolt passing through the same.

Referring more particularly to the drawings, 10 indicates an arm which may be pivotally secured to a door frame 11 while 12 indicates a second arm which may be pivotally secured to a door 14 or a door closer 13 secured thereto. These arms are pivotally secured together, this pivotal connection being shown in greater detail in Fig. 2.

The arm 12 is equipped with a friction disc 29 having a friction face 12'. This disc 29 has a square bore 13ª which is adapted to contain the square bolt 14. A threaded friction sleeve 15 having upper and lower friction faces 16 and 17 and a square bore 18 fits over bolt 14 and is mounted for axial movement thereon.

A friction block 19 having upper and lower friction faces 20 and 21 is threaded on the sleeve 15 as shown in Fig. 2. This friction block is equipped with the bifurcated arm 22 having holes 23 for the retention of a rivet by means of which this friction block is secured to the arm 10. Mounted on the bolt 14 above these various friction members is the friction disc 24 having a square bore 25 for movement axially on the bolt 14. This upper disc is also equipped with a frictional surface 26. A nut 27 is threaded on the upper portion 28 of the bolt 14 and maintains the various discs in their relation on the square bolt. This nut is initially adjusted so that there is considerable play between the various members mounted on the bolt. By adjusting the amount of play the position at which the door is held open is determined in a manner to be explained hereafter.

As will be obvious from the drawings, when the arms 10 and 12 are rotated relatively to each other, the square bolt 14 will rotate with arm 12 and face 12'. The friction members 15 and 24 will move therewith since the same are mounted against rotary movement relatively to the bolt. This will cause the friction block 19 of the arm 10 to rotate relatively to the sleeve 15 and this relative rotation will cause 19 to ride either up or down on the threads of the sleeve.

This relative axial movement of the members 15 and 19 will serve to lengthen the axial distance they occupy on the bolt 14 so as to take up the play existing between the various friction members. As shown in Fig. 2, this relative movement has caused the upper friction surface 20 of the block 19 to engage surface 26 of disk 24, while surface 17 of the sleeve 15 is brought into engagement with surface 12'. This relationship of the parts will be sufficient to hold a door in the desired open position.

If the device be used on a door opening in a reverse direction, the block 19 will ride downward relatively to sleeve 15 so that its lower surface 21 will contact with 12' while the upper surface 16 of the sleeve 15 will contact with surface 26 of the disk 24. Thus, my invention will operate equally well without any adjustment regardless of the direction of the opening of the door.

When it is desired to vary the position at which the door is held open, it is only necessary to alter the position of nut 27 to increase or decrease the initial play in the disks so that a greater or lesser rotation of the door is necessary to cause the friction faces to move to engaging position.

While I have shown my holding device as applied to a door closer, I want it understood that the same may be used independently of the same. Similarly, while I have shown it as applied as a part between the two arms of a door closer, I want it understood that it may be applied at any point of a door closer assembly such as the bearing portion of the door closer shaft as illustrated in my copending application Serial No. 749,455.

I claim:

1. In a door holder, a pair of pivotally connected arms, one to be attached to a door casing and the other to be attached to a door, said pivotal connection comprising a pair of friction disks and an externally threaded friction sleeve carried by one of said arms, an internally threaded block mounted on the threads of said friction sleeve, said block being secured to the other of said arms.

2. In a door holder, a pair of pivotally connected arms, one to be attached to a door casing and the other to be attached to a door, a pair of friction disks carried by one of said arms, a square bolt passing through square bores in said friction disks, an externally threaded friction sleeve having a square bore mounted on said bolt between said friction disks, and an internally threaded friction block mounted on the external threads of said sleeve, said friction block being attached to the other of said arms.

3. In a door holder, a pair of arms, a pivotal connection between said arms comprising a pair of friction disks carried by one of said arms, a bolt on which said disks are non-rotatably mounted, an externally threaded friction sleeve similarly mounted on said bolt between said friction disks and having friction faces at its ends adapted to engage either of said disks, means on said bolt for limiting the space occupied by the friction disks and sleeve, an internally threaded friction block carried by the other of said arms mounted on said threaded sleeve and also having frictional end faces adapted to engage either of said friction disks, said friction block being adapted to be displaced longitudinally relatively to said sleeve so that one of its end faces engages one of said disks, while one of the sleeve end faces engages the other of said disks when the arms are rotated relatively to each other upon the opening of the door.

4. In a door holder, a shaft, a plurality of axially mounted friction members initially held loosely upon said shaft, one of said friction members being in screw-threaded relation to another of said friction members, means for relatively rotating said threaded friction members to cause the same to move axially through their screw-threaded relation to bind the entire plurality of friction members axially on the shaft.

5. A holder device for a door comprising a bolt, a plurality of friction disks and an externally threaded friction sleeve mounted on said bolt, an internally threaded friction block mounted on the external threads of said sleeve, and means for relatively rotating said sleeve and block when the door is opened.

6. A holder device for a door comprising a pair of friction disks, a pair of movable friction members, cooperating cam means on each of said movable members, means actuated upon the opening of the door for relatively rotating said members, said cooperating cam means being adapted when said members are relatively rotated to move each of said members into engagement with one of said friction disks.

7. In a door holder, a bolt, upper and lower friction disks mounted on said bolt, an externally threaded friction sleeve having upper and lower friction faces also mounted on said bolt, an internally threaded friction block mounted on the screw threads of said sleeve and also having upper and lower friction surfaces, said sleeve and block when rotated relatively to each other being movable axially to cause a lower face of one and an upper face of the other to move into engagement with said friction disks.

8. In a door holder, a sleeve and block threaded one within the other, friction faces at the ends of each, a pair of friction disks mounted on the axis of said sleeve and block but axially displaced from the end faces of the same, means for rotating said sleeve and block relatively one with the other, said sleeve and block being adapted to move axially when so rotated to cause opposite end faces of each to engage one or the other of said friction faces dependent upon the rotary direction of said block and sleeve during their relative rotation.

9. A holder device for a door comprising a bolt, a pair of parallel friction surfaces and an externally threaded friction sleeve non-rotatably mounted on said bolt, an internally threaded friction block mounted on said threaded sleeve, said block and sleeve being movable axially relatively to each other and into engagement with said friction surfaces when rotated relatively to each other, and means for rotating said block and sleeve relatively to each other when the door is opened.

10. A door holding device, comprising a pair of friction disks slidably but non-rotatably mounted on a bolt, an externally threaded sleeve similarly mounted on said bolt between said disks, an internally threaded friction block mounted on said sleeve threads and adapted to move longitudinally relatively to said bolt and sleeve when rotated relatively to the same, means actuated by the opening of the door to rotate said block relatively to the sleeve, and means for limiting the length of bolt to be occupied by said group of friction members.

Signed at Stamford in the county of Fairfield and State of Connecticut this 14th day of December A. D. 1927.

ROBERT S. POTTER.